United States Patent [19]

Häkkinen et al.

[11] Patent Number: 4,735,539

[45] Date of Patent: Apr. 5, 1988

[54] APPARATUS FOR HANDLING SHEETS OR THE LIKE

[75] Inventors: Leo Häkkinen, Tampere; Juha Vainio, Nattari, both of Finland

[73] Assignee: Oy Tampella AB, Tampere, Finland

[21] Appl. No.: 19,633

[22] Filed: Feb. 27, 1987

[30] Foreign Application Priority Data

Apr. 28, 1986 [FI] Finland ................................ 861776

[51] Int. Cl.⁴ ......................... B65G 59/04; B65G 1/20

[52] U.S. Cl. .................................... 414/281; 414/277; 414/121; 414/734; 414/737; 414/626; 414/627; 414/282

[58] Field of Search ............... 414/281, 282, 283, 280, 414/277, 266, 267, 659, 660, 121, 120, 122, 43, 47, 734, 736, 737, 733, 785, 627, 626, 789, 631, 667, 664

[56] References Cited

U.S. PATENT DOCUMENTS 3,776,393 12/1973 Bargstedt ........................ 414/733 X
4,242,024 12/1980 Buta et al. ............................. 414/43

FOREIGN PATENT DOCUMENTS

EP0066182 12/1982 European Pat. Off. ............ 414/664
1295482 5/1969 Fed. Rep. of Germany ...... 414/281
3318420 11/1984 Fed. Rep. of Germany .
WO85/03495 8/1985 PCT Int'l Appl. ................. 414/282
371986 12/1974 Sweden .

*Primary Examiner*—Frank E. Werner
*Attorney, Agent, or Firm*—Nixon & Vanderhyde

[57] ABSTRACT

The invention relates to an apparatus for handling sheets or the like. The apparatus comprises a bridge structure displacable on rails, an upper carriage displaceable on the bridge structure in a direction perpendicular to the rails, vertical beams attached to the upper carriage, and a carriage displaceable on the vertical beams in the direction thereof. The carriage is provided with lifting forks for removing a sheet pack or the like from a shelf place. The carriage is further provided with a gripper frame for picking up a sheet or the like from the shelf place or the like. In order to provide a simple and reliable apparatus, the carriage is provided with arms pivotable around a horizontal axis from a first position above the lifting forks and essentially in parallel therewith to a second position, and vice versa. The gripper frame is, at its symmetry axis essentialy parallel to the carriage, fastened between the arms in such a manner that the gripper frame is entirely beyond the edges of the carriage in the first and the second position of the arms. The gripper frame is pivotable around an axis going through the connection points between the arms and the gripper frarme.

7 Claims, 3 Drawing Sheets

APPARATUS FOR HANDLING SHEETS OR THE LIKE

Figure 1:
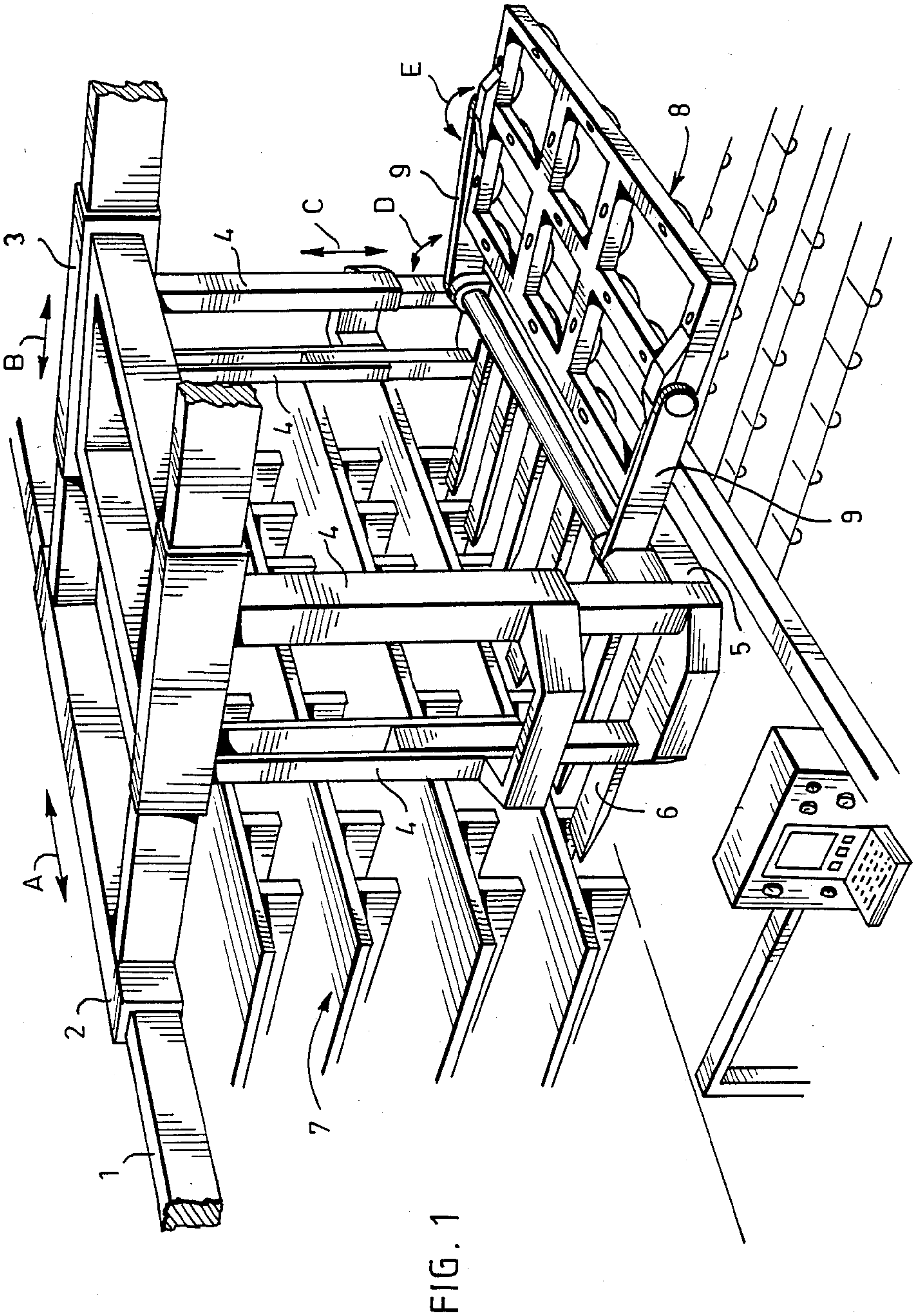

The invention relates to an apparatus for handling sheets or the like, comprising a bridge structure displaceable on rails, an upper carriage displaceable on the bridge structure in a direction perpendicular to the rails, vertical beams attached to the upper carriage, and a carriage displaceable on the vertical beams in the direction thereof, the carriage being provided with lifting forks for removing a sheet pack or the like from a shelf place and with a gripper frame for picking up a sheet or the like from the pack or the like removed from the shelf place.

Apparatuses of this kind are well-known in industrial use. These known apparatuses are usually supported on roller races very near the ceiling. A vertically displaceable beam or carriage is attached to the apparatus, and the beam or the carriage is provided with lifting forks or the like for gripping objects. By means of the apparatuses, it is possible to pick up sheets from a shelf or the like or rod-shaped objects from a rod store. The apparatus disclosed in German Offenlegungsschrift 3,318,420 may be mentioned as an example of these apparatuses.

A drawback of known apparatuses is that they cannot be used for handling sheet packs or the like when one sheet at a time is to be picked up from the pack. It is thereby necessary that each shelf place contains one sheet only, as a result of which a great number of shelf places has to be provided at a store. A drawback of lifting forks is that sheets cannot be placed on the floor, for instance, by means of the forks, because it is not possible to draw the forks away from under the sheets.

For the above reason, gripping means operating on the suction pad principle, for instance, have been developed. The apparatus disclosed in Swedish Published Specification 371,986 may be mentioned as an example of such means. A drawback of gripping means operating on the suction pad principle is that they cannot be pushed into a narrow vertical space between shelves, because the suction pads take relatively plenty of room. Therefore apparatuses of this kind also have to be provided with lifting forks. Consequently, an apparatus such as disclosed in the above-mentioned Swedish publication is relatively high and complicated in construction, wherefore it is expensive and clumsy in use.

The object of the invention is to provide an apparatus for handling sheets or the like, which apparatus avoids the drawbacks of prior solutions. This is achieved by means of an apparatus according to the invention, which is characterized in that said carriage being provided with arms pivotable around a horizontal axis from a first position above the lifting forks and essentially in parallel therewith to a second position, and vice versa, said gripper frame being, at its symmetry axis essentially parallel to the carriage, fastened between the arms in such a manner that the gripper frame is entirely beyond the edges of the carriage in the first and the second position of the arms, and said gripper frame being further pivotable around an axis extending through the connection points between the arms and the gripper frame.

The apparatus according to the invention is advantageous in that it enables the handling of sheet packs in narrow spaces between shelves, whereby one sheet can be easily picked up from a sheet pack, and the other sheets can be returned on to the shelf. On the other hand, the entire sheet pack can be picked up, so that the sheets can be distributed directly to machines in need of them by means of the gripping means. This arrangement minimizes the need of floor area, and shelves can be built high without any difficulty. Sheets can be taken by means of the apparatus to all machines positioned below the bridge structure, and the machines do not need to be in alignment. The apparatus according to the invention is also suitable for use in connection with flame cut tables in which two sheets are positioned side by side. In addition, the gripping means can be used for picking up the flame cut pieces, so that an underpressure is applied only to certain underpressure grippers. The space above the lifting forks may thereby be used as an intermediate store for the flame cut pieces. The apparatus according to the invention is simple in structure, inexpensive, and does not take plenty of room. By means of the apparatus, sheets can be taken out of a railway carriage or from the floor, and it can be used for carrying out the normal lifting operations of a bridge crane. By means of the apparatus according to the invention, it is also possible to pick up sheets which are in a vertical position, or the sheets or the like can be positioned to the vertical position.

Figure 2:
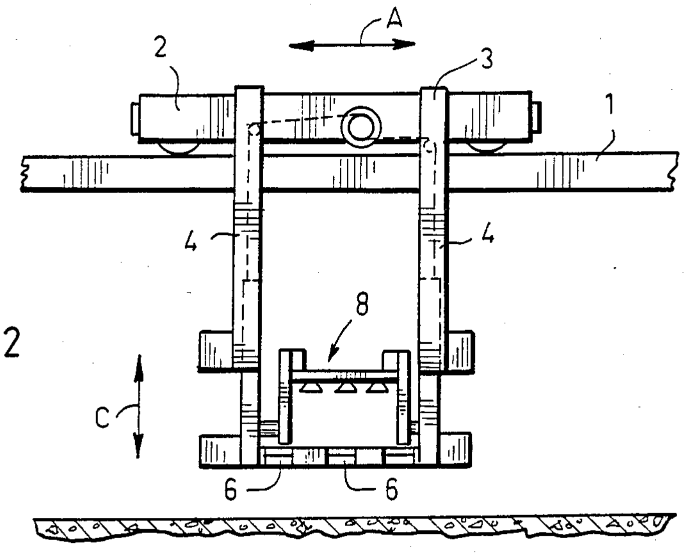
Figure 3:
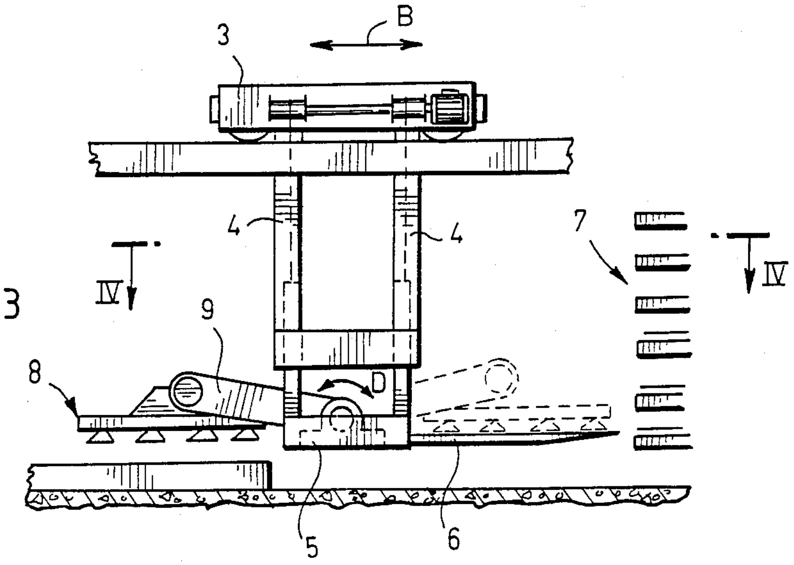
Figure 4:
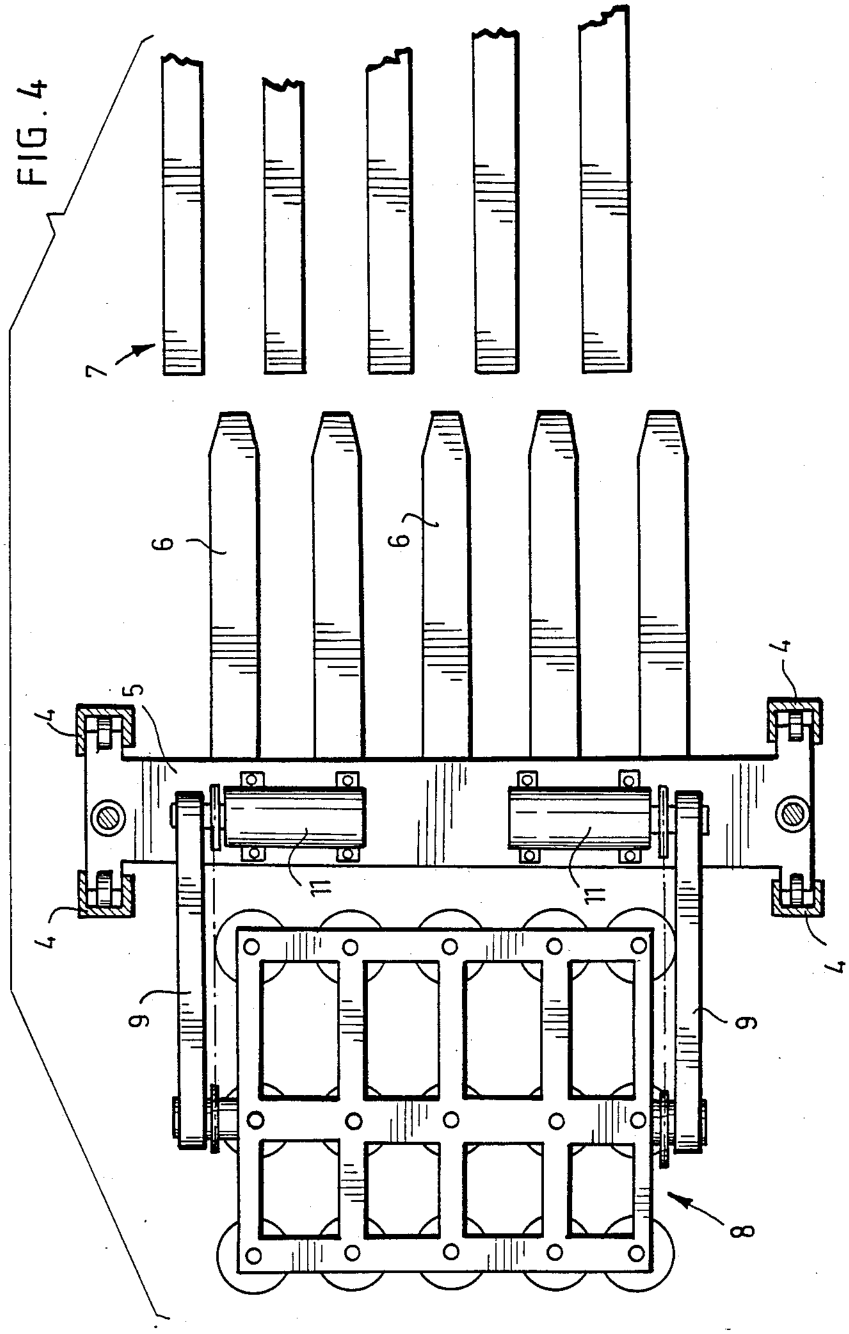

The invention will be described in the following by means of a preferred embodiment described in the attached drawing, whereby FIG. 1 is a perspective view of an apparatus according to the invention, FIG. 2 is a general view of the apparatus according to the invention seen in a direction perpendicular to the rails, FIG. 3 illustrates the apparatus of FIG. 2 seen in the direction of the rails, and FIG. 4 is a sectional view of the apparatus of FIG. 3 seen in the direction of the arrows IV—IV.

In the example of the figures, the reference numeral 1 indicates rails on which a bridge structure 2 is displaceable in the direction A. An upper carriage 3 displaceable in the direction B is supported by the bridge structure 2. Vertical beams 4 are attached to the upper carriage 3, and a carriage 5 displaceable in the vertical direction C is supported on the beams.

Lifting forks 6 are attached to one edge of the carriage 5 for picking up a sheet pack or the like from a shelf place 7. In addition, a gripper frame 8 is fastened on the carriage 5 for picking up a sheet or the like from the sheet pack taken from the place 7.

According to the invention, the carriage 5 is provided with arms 9 pivotable around a horizontal shaft. This pivoting movement is shown in the figures by means of the arrow D. The arms 9 can be pivoted from a first position above the lifting forks 6 and essentially in parallel therewith to a second position, in the example of the figures essentially over 180 degrees. The gripper frame 8 is fastened between the arms 9 at its axis of symmetry, which is essentially parallel to the carriage 5, in such a manner that the gripper frame 8 is entirely beyond the edges of the carriage 5 in the first and the second position of the arms 9. This kind of function enables a sheet to be displaced outside the carriage or on to the carriage from outside the carriage. The first and the second position and the gripper frame in these positions appear particularly clearly from FIG. 3. Further, the gripper frame is pivotable around a shaft going through the connection points between the arms 9 and the gripper frame 8. This pivoting movement is shown by means of the arrow E in the figures.

The ends of the arms 9 on the side of the carriage 5 can be secured stationarily to the carriage 5, as in the example of the figures, or the ends can be arranged to move independently of the movements of the carriage 5 essentially in the direction of the vertical beams 4. This function enables the gripper frame to be lifted independendly of the lifting forks 6. It is thereby possible to grip sheets positioned on different levels, for instance.

The function of the movements of the arms 9 is to displace the gripper frame 8 on to a sheet pack positioned on the lifting forks 6 so that grippers 10 of the gripper frame, such as underpressure grippers, grip the topmost sheet, and this sheet can be displaced e.g. on to a flame cut table by pivoting the arms by means of torque motors 11. During this movement, the gripper frame can be kept continuously in the horizontal position e.g. by means of a so called parallel chain or other such mechanism. The gripper frame is always positioned above the sheet, so that the sheet can be detached and left at a desired place. Alternatively, the sheet can be lifted by means of the gripper frame, and displaced on to the lifting forks.

The gripper frame 8 can also be pivoted in the direction E e.g. by means of a torque motor. This movement is necessary e.g. when the apparatus is displaced into a narrow space between two sheet shelves, because the useless space between the shelves has to be as small as possible. The movement is also needed when handling vertically positioned sheets. The pivoting movement can be arranged to take place completely independently of the movement of the carriage or the arms.

The apparatus according to the invention operates in principle in the following way. The bridge structure 2 is displaced on the rails 1 e.g. by means of a hydraulic motor, and the upper carriage 3 is driven between shelves on which the sheets to be taken are positioned. Thereafter the gripper frame 8 is pivoted to the vertical position by turning the arms 9 to the vertical position (movement D), and by turning the gripper frame in the vertical direction or by keeping the gripper frame in position with respect to the arms. In this way, even narrow shelf spaces can be reached. Thereafter the lifting forks 6 are displaced to a suitable height and under a sheet pack, so that the sheet pack can be removed from the shelf. It is also possible to provide a parallel automation for the pivoting movement D in such a manner that the forks 6 and the gripper frame are almost one upon the other in the initial position, and when the forks 6 are displaced into the shelf places by displacing the carriage 5 in the horizontal direction, the gripper frame 8 is displaced simultaneously in the opposite direction by pivoting the arms 9 towards the second position, at the same time keeping the gripper frame 8 continuously in a position parallel to the lifting forks e.g. by means of said parallel chain during the movement of the arms. When moving in the other direction, the directions of the movements are reversed. When the arms 9 are in the first position, and the grippers of the gripper frame are able to grip the topmost sheet on the lifting forks, the sheet can be displaced on to the gripper frame, and the other sheets can be returned on to the shelf by means of the lifting forks. Correspondingly, the entire sheet pack can, however, be picked up if more sheets are needed. It is thereby possible to pass the sheets one by one to machines which are in need of sheets. If the apparatus is used for displacing sheets on to shelves, the operation is naturally reversed.

The above example is by no means intended to restrict the invention, but the invention can be modified within the scope of the claims in various ways. Accordingly, it is self-evident that the lifting forks, for instance, can be stationary or pivotable, so that it is, for instance, possible to pick up sheets from shelves positioned opposite to each other. The upper carriage 3 can also be rotatable around a vertical shaft, so that it is possible to pick up sheets from shelves opposite to each other. The grippers of the gripper frame do not, of course, need to be underpressure grippers; instead, magnetic grippers or conventional gripping means, etc., can be used. Conventional gripping means can be used for gripping rod-shaped objects, for instance. The gripper can also be an expandable mandrel by means of which e.g. paper rolls or other such hollow objects can be handled. The movements of the different parts can be effected in any suitable manner; thus, is it clear that FIG. 2 shows generally only one possible embodiment of the lifting means of the vertical beams. Instead of a parallel chain, it is naturally possible to use some other solution for keeping the gripper frame in position, e.g. in a horizontal position, during the movement of the arms. Other possible solutions include different kinds of electric motor applications, etc. The angle between the first and the second position of the arms does not, of course, have to be 180 degrees, as in the figures, but the angle position depends on the application in each particular case. Thus, the angle may be e.g. 170, 240 or 270 degrees, etc.

What is claimed is:

1. An apparatus for handling sheets or the like, comprising a bridge structure displaceable on rails, an upper carriage displaceable on the bridge structure in a direction perpendicular to the rails, vertical beams attached to the upper carriage, and a carriage displaceable on the vertical beams in the direction thereof, the carriage being provided with lifting forks for removing a sheet pack or the like from a shelf place and with a gripper frame for picking up a sheet or the like from the pack or the like removed from the shelf place, said carriage being provided with arms pivotable around a horizontal axis from a first position above the lifting forks and essentially in parallel therewith to a second positon, and vice versa, said gripper frame being, at its symmetry axis essentially parallel to the carriage, fastened between the arms in such a manner that the gripper frame is entirely beyond the edges of the carriage in the first and the second position of the arms, and said gripper frame being further pivotable around an axis extending through the connection points between the arms and the gripper frame whereby a sheet is removed from the sheet pack on the lifting forks by the gripper frame in the first position and removed from the carriage for deposit at the second position.

2. An apparatus according to claim 1, wherein the gripper frame is arranged to be essentially in parallel with the lifting forks in the first position of the arms, the movement of the arms from the first position towards the second position, and vice versa, during picking up sheets from the shelf place, is dependent on the horizontal movement of the lifting forks towards the shelf place and away therefrom, and the gripper frame is arranged to be kept continuously in a position essentially parallel to the lifting forks during the movements of the arms.

3. An apparatus according to claim 1, wherein the gripper frame is pivotable around the axis thereof independently of the movements of the carriage or the arms.

4. An apparatus according to claim 1 or 2, wherein the ends of the arms on the side of the carriage are attached stationarily to the carriage.

5. An apparatus according to claim 1 or 2, wherein the ends of the arms on the side of carriage are displaceable independently of the movements of the carriage essentially in the direction of the vertical beams.

6. An apparatus according to claim 2 wherein the ends of the arms on the side of the carriage are attached stationarily to the carriage.

7. An apparatus according to claim 2 wherein the ends of the arms on the side of the carriage are displaceable independently of the movements of the carriage essentially in the direction of the vertical beams.

* * * * *